United States Patent

[11] 3,617,577

[72] Inventor Thomas M. King
 St. Louis, Mo.
[21] Appl. No. 853,552
[22] Filed Aug. 27, 1969
[45] Patented Nov. 2, 1971
[73] Assignee Monsanto Company
 St. Louis, Mo.

[54] METHOD OF INHIBITING SCALE FORMATION
 2 Claims, No Drawings
[52] U.S. Cl....................................................... 210/58,
 252/181, 21/2.7
[51] Int. Cl........................................................ C02b 5/06
[50] Field of Search............................................ 21/2.7;
 210/58; 252/82, 181

[56] References Cited
UNITED STATES PATENTS
2,723,956 11/1955 Johnson ...................... 210/58
3,336,221 8/1967 Ralston ...................... 210/58

Primary Examiner—Reuben Friedman
Assistant Examiner—Thomas G. Wyse
Attorneys—Richard W. Sternberg, Roger R. Jones and Thomas N. Wallin ABSTRACT: Precipitation of scale-forming alkaline earth salts in aqueous systems is inhibited by maintaining threshold concentrations of ethylene-maleic acid copolymers having molecular weights of from about 1,000 to 5,000 in the system.

METHOD OF INHIBITING SCALE FORMATION

BACKGROUND OF THE INVENTION

This invention relates to methods of inhibiting the precipitation of scale-forming alkaline earth salts in aqueous systems. More particularly, the invention relates to a method of inhibiting scale formation in such systems by maintaining threshold amounts of ethylene maleic acid copolymers therein.

It is well known that water available in many regions of the country commonly contains alkaline earth cations, particularly calcium and magnesium, capable of forming insoluble salts, e.g., bicarbonates, carbonates, sulfates, phosphates, fluorides, silicates the like. Precipitation of these salts to form scale deposits on water containing and distribution apparatus, e.g., boilers, pipes, etc., is a recognized detriment associated with the use of water containing substantial quantities of such materials.

It is known that scale formation can be prevented by the use of sequestering or chelating agents in aqueous systems containing alkaline earth ions as described above. However, the quantities of agents required for chelation or sequestration of such ions are often economically unfeasible. It is further known, that certain inorganic polyphosphates are capable of preventing scale formation when used in amounts substantially less than that stoichiometrically required for sequestration or chelation of the ions. However, polyphosphate salts undergo hydrolysis to form products which do not inhibit scale deposition.

SUMMARY OF THE INVENTION

It is an object of this invention to provide a novel method of inhibiting scale formation in aqueous systems. This method comprises the addition of "threshold" amounts of linear ethylene-maleic acid copolymers having a molecular weight of from 1,000 to 5,000 to aqueous systems containing alkaline earth cations.

The invention will be better understood from the following description of the preferred embodiments.

DESCRIPTION OF THE PREFERRED EMBODIMENTS

This invention resides in the discovery that the addition of "threshold" amounts of ethylene-maleic acid copolymers to aqueous systems containing alkaline earth cations inhibits scale formation therein.

The term "threshold amounts" as used hereinafter in the specification and claims can be understood by reference to the effect of various amounts of the scale inhibition agents of this invention on scale deposition in hard water. When quantities of inhibitor substantially less than stoichiometric requirements for sequestration of scale-forming ions in an aqueous system are added to such a system, scale deposition is effectively inhibited. This is true even if trace quantities of inhibitor—1 part/million or less by weight of solution—are utilized. However, as additional quantities of inhibitor are added (the exact quantity, depending on temperature and composition of the system) an increase in turbidity is observed which can be removed only by adding additional inhibitor sufficient to reduce the turbidity via sequestration. Concentrations of inhibitor below stoichiometric concentrations and also below the concentration resulting in a turbidity increase, as described above, are considered "threshold amounts" in accordance with this invention.

It is noted that ethylene-maleic acid copolymers do not, as a class, inhibit scale formation when utilized in threshold amounts. For the successful practice of this invention, it is essential that the polymer have a molecular weight of from 1,000 to 5,000. With lower molecular weight and higher molecular weight copolymers, no substantial inhibition of scale deposition is achieved at threshold concentrations.

The invention is preferably practiced by adding ethylene-maleic anhydride copolymer to an aqueous system wherein the copolymer is hydrolyzed to the acid form.

EXAMPLE I

Ethylene-maleic anhydride copolymers in the concentrations and having molecular weights as shown in table 1 below, are added to an aqueous system containing calcium chloride (the anhydride is, of course, substantially hydrolyzed to the acid form). Sodium sulfate is added to the system, the quantities of sodium sulfate and calcium chloride being such as to provide a system containing a potential 10,000 parts/million by weight calcium sulfate. After two days, the ratio of calcium in solution to total calcium is experimentally determined. The results are presented in table 1, a high ratio being indicative of effective scale deposition inhibition.

TABLE

| mole. wt. of ethylene maleic anhydride added to system | concentration of copolymers in system p.p.m. by weight | ratio of calcium in solution to total calcium |
| --- | --- | --- |
| — | none | 0.34 |
| 1000 | 10 | 0.8 |
| 3000 | 15 | 1 |
| 5000 | 5 | 1 |
| 10,000 | 10 | 0.34 |
| 20,000 | 5 | 0.34 |

The above data illustrates that ethylene-maleic acid copolymers having molecular weights of from about 1,000 to 5,000 effectively inhibit scale deposition when utilized in threshold concentrations.

What is claimed is:

1. A method of inhibiting precipitation of scale forming alkaline earth salts in aqueous systems, said method comprising maintaining in said system a threshold concentration of a linear ethylene-maleic acid copolymer having a molecular weight of from about 1,000 to 5,000.

2. The method of claim 1 wherein said threshold concentration is provided by the addition of ethylene-maleic anhydride copolymer to said system.

* * * * *